United States Patent [19]

Schiffner

[11] 4,436,422

[45] Mar. 13, 1984

[54] SENSOR WHICH IS SENSITIVE TO PRESSURE, TENSION, TORSION AND HEAT AND A PROCESS OF OPERATION

[75] Inventor: Gerhard Schiffner, Munich, Fed. Rep. of Germany

[73] Assignee: Siemens Aktiengesellschaft, Berlin & Munich, Fed. Rep. of Germany

[21] Appl. No.: 179,665

[22] Filed: Aug. 19, 1980

[30] Foreign Application Priority Data

Sep. 7, 1979 [DE] Fed. Rep. of Germany ....... 2936303

[51] Int. Cl.$^3$ .................................................. G01B 9/02
[52] U.S. Cl. ...................................... 356/349; 356/350
[58] Field of Search ........................ 356/350, 351, 349

[56] References Cited

U.S. PATENT DOCUMENTS 4,299,490 11/1981 Cahill et al. .......................... 356/350
4,302,107 11/1981 Schiffner et al. ..................... 356/350

OTHER PUBLICATIONS

Arditty, H., et al., "Re-Entrant Fiberoptic Approach to Rotation Sensing", SPIE, vol. 157, Laser Inertial Rotation Sensors, pp. 138–144.

*Primary Examiner*—Bruce Y. Arnold
*Attorney, Agent, or Firm*—Hill, Van Santen, Steadman & Simpson

[57] ABSTRACT

A sensor is disclosed which utilizes a ring interferometer for receiving light with a polarizer provided in each of the paths of the superimposed beams exiting the interferometer so that only light polarized in a fixed direction relative to the direction of polarization of the light being coupled into the interferometer is detected. The sensor is particularly adapted to determining influences such as pressures, tensions, torsion, and heat in addition to rotation. In one embodiment, the Faraday effect is utilized to compensate for transit time differences and the amount of energy required to compensate by the Faraday effect is measured to determine the amount of influence.

5 Claims, 2 Drawing Figures

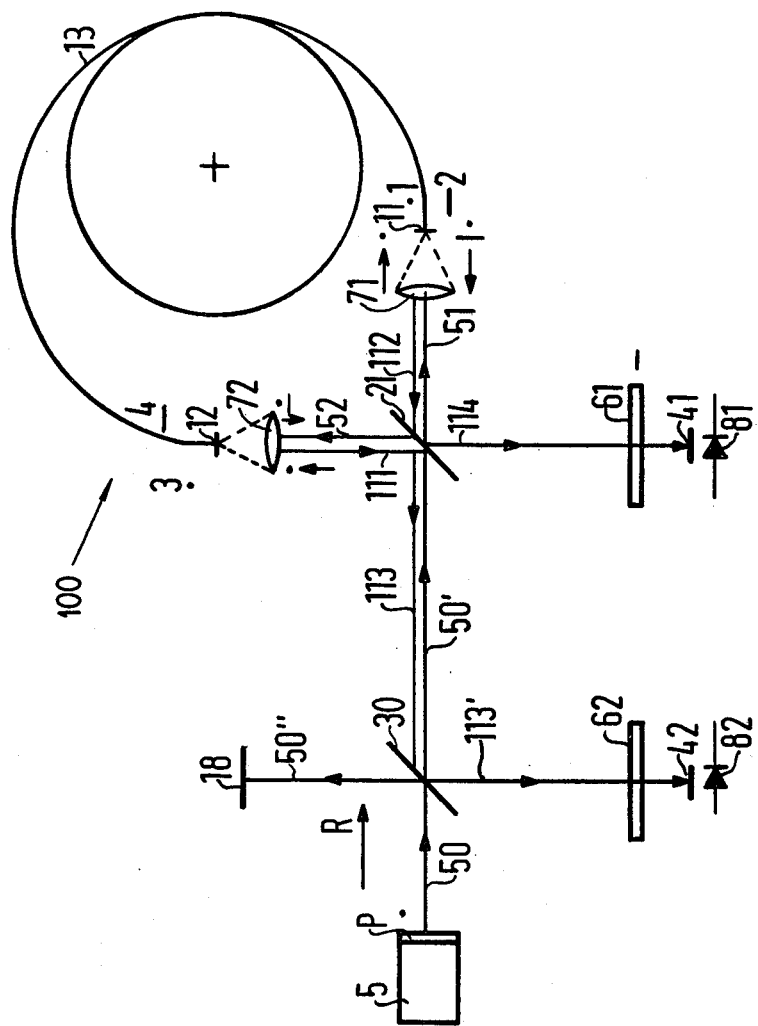

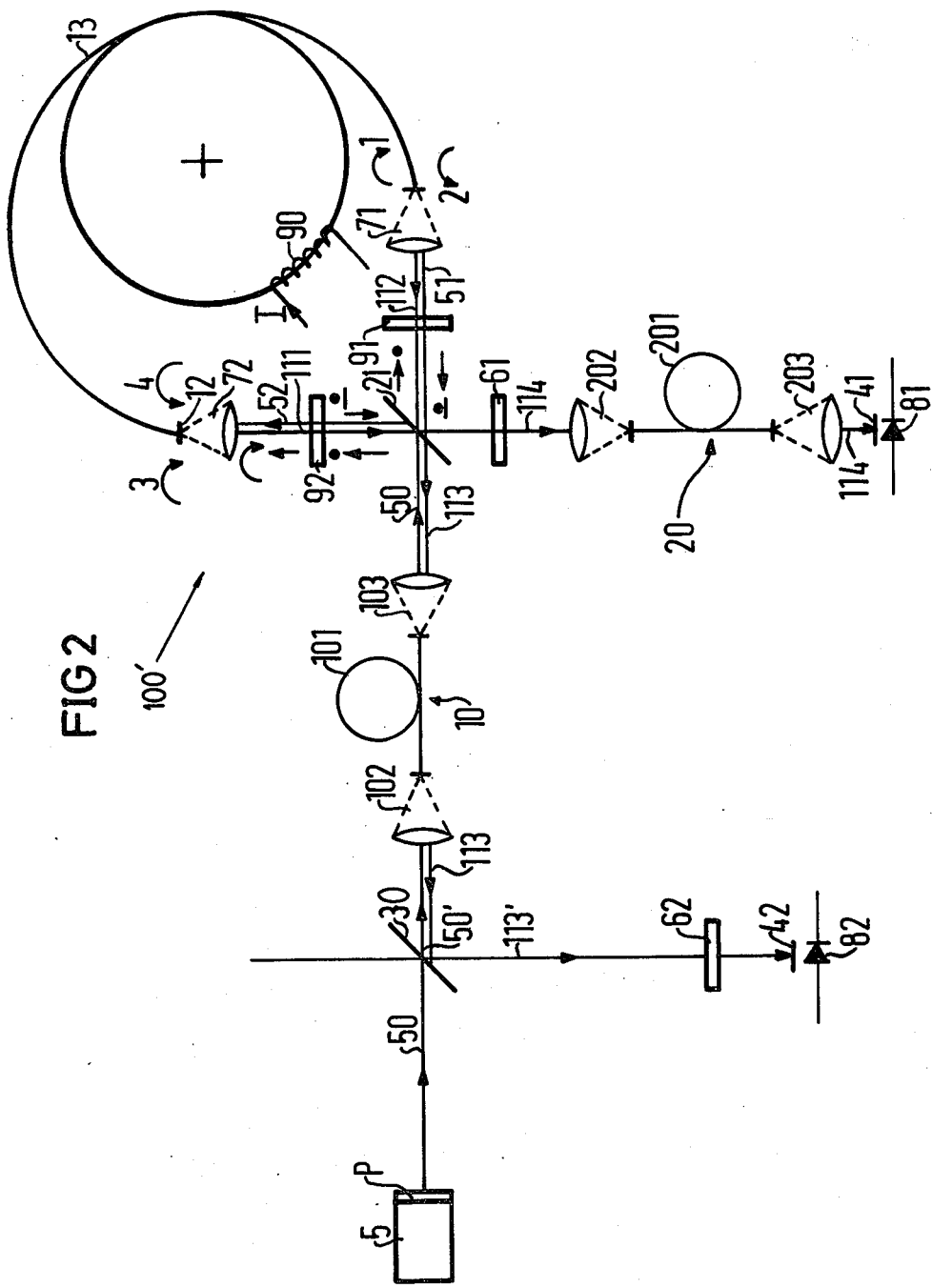

SENSOR WHICH IS SENSITIVE TO PRESSURE, TENSION, TORSION AND HEAT AND A PROCESS OF OPERATION

BACKGROUND OF THE INVENTION

The present invention is directed to a sensor which is sensitive to pressure, tension, torsion and heat and to a process of operation.

SUMMARY OF THE INVENTION

The present invention is directed to providing a novel and particularly sensitive sensor for determining influences including pressure, tension, torsion and heat which are being applied to a portion of the sensor.

These tasks are realized by a sensor, which includes a ring interferometer having a light source, a pair of detectors, and a light waveguide being wound in a coil with a coupling point at each end, said waveguide being capable of propagating a first mode of a specific first polarization state and simultaneously propagating only one second mode of a second polarization state of a fixed relationship to said first polarization state, said interferometer having means for coupling light of one of said first and second polarization states from said source into each coupling point of the waveguide for propagation therein to the other coupling point for output coupling therefrom, means for receiving said output coupled light from said pair of coupling points and superimosing components thereof into two separate superimposed beams and separately directing said two separate superimposed beams at said pair of detectors, and a polarizer disposed in the path of each separate superimposed beam adjacent a receiving surface of the respective detector, each of said polarizers being transparent to one of said two polarization states so that the influences of said interferometer create a change in light intensity received by said detectors.

The invention exploits the fact that in a light waveguide in which only one mode is capable of propagating in only two independent polarization states, an over coupling can occur from one of the first polarization state to another or second state in response to exposing the light waveguide to changes or influences which include pressure, tension, torsion and heat. The output coupled light thus contains either more or less light components of the other or second polarization state in response to the amount of the forementioned influences. Only these light components of the second state can pass through the polarizer and strike the light receiving surfaces, be superimposed on each other and thus interfere with one another. The interferometer corresponds to the phase difference between the light components which are output coupled from the two coupling points and which produce interference with one another and with which both occupy the other or second polarization state. The phase difference represents a gauge of the level of the change in pressure, temperature, torsion and/or temperature.

The sensor can be operated with either linearly polarized light or circularly polarized light. In either case, the other or second polarization state is a polarization state which is orthogonal to the first polarization state.

A particularly expedient embodiment of the invention consists in that the waveguide mode diaphragms are arranged in specific light paths of the ring interferometer. In this way, it is possible to reduce the adjustment sensitivity of the ring interferometer. A waveguide mode diaphragm is to be understood as a light waveguide in which only one mode is capable of being propagated. A light waveguide of this type is arranged in the specific light path of the ring interferometer in such a manner that it forms a part of the light paths, i.e. the light incoming on the specific light path which is input coupled into the ends of the light waveguide and output coupled at the other ends.

Waveguide mode diaphragms of this type are superior to conventional mode diaphragms, which conventional mode diaphragm operate by using extremely small openings in a diaphragm or screen which are impermeable to light.

The proposed sensor is operated in such a manner that the light waveguide which serves as a sensing element is exposed to the various influences including pressure, tension, torsion, and heat which is to be measured. The changes in the intensity of the light receiving surface is thus caused by these influences and is then measured.

Preferably, the proposed sensor is operated in such a manner that phase differences produced by the forementioned effects are continuously compensated with the aid of other effects which produce non-reciprocal transit time differences in the light waveguide. The dynamics of the sensor can be increased in this way. Expediently, the non-reciprocal transit time differences, which serve by way of compensation are produced by a Faraday effect. This has the advantage that the magnitude of a compensation current, which can be easily measured, can be used as a gauge of the magnitude or strength of the pressure, tension, torsion or the heat effect. The proposed sensors can be used as an accoustical sensor.

BRIEF DESCRIPTION OF THE DRAWINGS

FIG. 1 is a schematic view of an embodiment of a sensor utilizing polarized light in accordance with the present invention; and FIG. 2 is a schematic presentation of an embodiment of the present invention which has compensation for phase differences provided by means of the Faraday effect and utilizes circularly polarized light.

DESCRIPTION OF THE PREFERRED EMBODIMENTS

The principles of the present invention are particularly useful in a ring interferometer generally illustrated at 100 in FIG. 1 and 100' in FIG. 2. The sensor 100 includes a ring interferometer having a light source 5, two partially transparent reflectors 30 and 21, two lenses or optical arrangements 71 and 72, and a light waveguide 13. In the light waveguide 13, only two modes can be propagated in an orthogonal polarization state and the waveguide preferably consists of a monomode glass fiber wound to form a coil whose two end surfaces 11 and 12 form coupling points. In addition, the ring interferometer includes two light receiving surfaces 41 and 42 which, for example, represent the light sensitive surfaces of light sensitive sensors or detectors 81 and 82.

The light source 5, which is preferably a laser light source, transmits through a polarizer P to produce a linearly polarized light traveling in the direction R in the form of a laser beam 50. The laser beam 50 is directed at the partially transparent reflector 30, which is inclined at an angle of 45° thereto. A component 50'' of the laser beam is reflected by the reflector 30 and is received by a light absorber 18. A weakened laser beam 50', which is passed through the partially transparent reflector 30, strikes a partially transparent reflector 21, which is also inclined at an angle of 45° to the axis of the beam 50' in a manner similar to the reflector 30. Thus, the reflector 21 will pass a portion 51 of the laser beam to extend in the direction R and will reflect a portion 52 at right angles to the direction R. The lens or optics 71 and 72 are arranged with the optics 71 focusing the beam 51 onto the coupling point formed by the end surface 11 and the optics 72 focusing the beam 52 on the end surface forming the coupling point 12 so that the polarized light is coupled into each coupling point 11 and 12 of the waveguide 13.

The polarized light, which has been input coupled into the light waveguide 13, passes through the light waveguide and as it reaches the output end surface will be output coupled and focused by the optics 71 and 72, respectively. The focused light beam 112 is the light that has passed from the coupling point 12 through the waveguide 13 to the coupling point 11 to be output coupled and focused by the optics 71. It is noted that the output coupled portion 112 propagates in the opposite direction from the incoming beam 51. The incoming beam 51 which was coupled into the end point 11 passes through the waveguide 13 to be output coupled from the end point 12 and focused by the optics 72 as a beam 111 that progagates opposite to the direction of the beam 52. The beams 112 and 111 will each strike the partially transparent reflector 21.

A component of the output coupled light of the light beam 112 passes through the reflector 21 whereupon it is propagated in the same direction as previously and another part is reflected by the reflector 21 in a direction at right angles to the direction R. In a similar manner, a portion of the light beam 111 which was output coupled from the end surface 12 will pass through the reflector 21 and be propagated in the same direction as the reflected portion of the beam 112 and a second portion of the beam 111 is reflected to propagate in a direction opposite to the direction R as is the portion from the beam 112 that passes through the reflector 21.

Thus, from one side of the reflector 21 in a direction opposite the direction R, there is emitted a light beam 113 which is formed by superimposing a reflected component of the beam 111 with a portion of the beam 112 which passes through the reflector. On the other side of the reflector 21, there is emitted a light beam 114, which is formed by superimposing a portion of the light beam 111 that passes through the reflector 21 and a reflected portion of the light beam 112. Thus, the reflector 21 acts as means for receiving output coupled light from said pair of points 11 and 12 and superimposing components thereof into two separate superimposed beams 113 and 114. In addition, the reflector 30 receives the superimposed beam 113 and directs a portion 113' at the detector 82.

In both embodiments, the superimposed zone or path of the light beam 114 contains a polarizer 61, which is positioned ahead of the light receiving surface 41 of the detector 82. The superimposed zone of the reflected light beam 13' also contains polarizer 62 which is positioned ahead of the light receiving surface 42 of the detector 82.

The reason for using two light receiving surfaces 41 and 42 is that the use of the partially transparent reflectors or beam splitters 21 and 30, which can be considered a reciprocal optical four port junction (quad gate), produces two different groups of beams 113 and 114 in which light components are output coupled from the coupling points 11 and 12 and are superimposed upon one another. This type of construction of a ring interferometer is conventional. It is also a normal practice to use two light beams 113 and 114 for the measuring procedure as this involves certain advantages which, however, need not be discussed here. In place of the partially transparent reflector 21, it is possible to use other types of optical quad gates which have the same properties. For example, an optical directional coupler formed by light waveguides such as proposed in the copending U.S. application, Ser. No. 002,537, filed Jan. 11, 1979, which was issued as U.S. Pat. No. 4,325,636 and was based on German application No. P 28 04 119.2, can be used as the quad gates 21 and 30.

In the exemplary embodiment of the device 100 of FIG. 1, the light source 5, which has the linear polarizer P or is itself polarized, emits linearly polarized light whose polarization state is marked by a dot to distinguish it from the other polarization state which can be propagated in the light waveguide 13. The other or second polarization state (orthogonal to the first one) is indicated by a horizontal line. The first polarization state is input coupled via the coupling points 11 and 12 into the light waveguide 13, passes along the waveguide 13, is output coupled at these coupling points and conducted to the polarizers 61 and 62. These two polarizers 61 and 62 ar set up in such a manner that they transmit only the other or second polarization state which is capable of being propagated in the light waveguide 13 and is indicated by the horizontal line so that the signals produced in the sensors or detectors 81 and 82 are governed only by the light of this other or second polarization state.

The theoretical basis of the mode of operation of the proposed sensor is as follows:

In conformity with known Four-pole Theory, the light waveguide 13 can be considered as a four port junction (quad gate), which can be described by the scattering matrix S known in microwave technology. If the light waveguide is considered as a four port junction, each coupling point 11 and 12 is assigned two ports. The coupling point 11 is assigned the ports 1 and 2 and the coupling 12 is assigned ports 3 and 4, the ports 1 and 3 will be assumed to be assigned the first polarization state which can be propagated and which is designated by the dot and the gates 2 and 4 will be assigned to the other (orthogonal) or second polarization state indicated by the line. The scattering matrix S of this four port junction possesses four columns and rows and its element $S_{ik}$ represents complex values which govern the transition from the port k to a to a port i. Under the assumption that, with respect to an inertial frame, the interferometer is at rest or in a uniform motion and no magnetic field prevails, the light waveguide 13 must be reciprocal, i.e. it must be true that $S_{ik}=S_{ki}$.

On account of the setting of the polarization filters 61 and 62, the signal occurring at the detectors 81 and 82 are governed by the light propagation from gate 1 to gate 4 and the light propagation from gate 3 to gate 2 and thus the matrix elements $S_{41}$ and $S_{23}$. These matrix elements need not be identical and change in response to pressure, tension, and heat influences on the wound light waveguide 13. The complex matrix elements $S_{41}$ and $S_{23}$ can be represented as follows:

$S_{41}=|S_{41}| \exp j\phi_{41}; S_{23}=|S_{23}| \exp j\phi_{23}$ wherein j signifies the imaginary unit and $\phi_{ik}$ represents the phase angle of the matrix element $S_{ik}$. Changes in the matrix element produced by pressure, tension, or heat influences are manifested as changes in the phase difference $\phi_{41}-\phi_{23}$. It is in fact that last mentioned phase difference which causes the ring interferometer to respond.

The second exemplary embodiment, which is generally indicated at 100' in FIG. 2 is designed for the application of the Faraday effect which produces non-reciprocal transit time changes in the light waveguide 13 by means of which the above mentioned phase differences can be compensated. Since the Faraday effect will only function in the requisite form when circularly polarized light is used, light of this kind must be input coupled into the light waveguide. As is known, circularly polarized light can be produced from a linearly polarized light and vice versa by means of a $\phi/4$ plate. Therefore, the exemplary embodiment 100' of FIG. 2 differs from that of 100 in FIG. 1 in that the beam paths between the partially transparent reflector 21 and the coupling points 11 and 12 of the light waveguide 13 each contain a $\phi/4$ plate 91 and 92 with the plate 91 being in the path of the beam 51 while the plate 92 is in the path of the beam 52. This $\phi/4$ plate converts light from the one linearly polarized state which can be propagated and which is indicated by a dot into a circularly polarized state which can be propagated in the light waveguide and which is indicated by an arrow pointing towards the right. The $\phi/4$ converts the other propagated linear polarization state which is characterized by a line and which is orthogonal to the first polarization state into a circular polarization state which can be propagated and is orthogonally polarized relative to the first circular polarization state. This second circular polarization state is characterized by an arrow pointing towards the left. The $\phi/4$ plates 91 and 92 are oriented in such a way that the linearly polarized light which is directed by the beam divider 21 and passes through the plates is converted by the two plates and is circularly polarized light directed either toward the left or towards the right.

The two polarization states are also reconverted by the $\phi/4$ plates into the assigned linear polarization state. Therefore, the polarizer 61 and 62 are the same as the embodiment generally indicated at 100 in FIG. 1 and are oriented in the same way.

Fudamentally, however, it would also be possible to use the light source, which from the start produces and propogates a light occurring in the first circular polarization state. In that case, the $\phi/4$ plates 91 and 92 would have to be removed and the polarizers 61 and 62 would have to be replaced by polarizers each of which is permeable only to the second circular polarization state. The non-reciprocal transit time differences resulting from the Faraday effect are produced by means of the electrical coil 90 whose turns embrace or surround a turn of the wound or coiled light waveguide 13. A current I passes through the coil and produces a magnetic field which results in the non-reciprocal transit time differences in the light waveguide. Signal changes at or between the detectors 81 and 82, which are caused by changes in the pressure, tension or temperature, can be compensated by a suitable change in the valve of current I. This change is carried out by means of a regulator. The dynamics of the sensor are substantially increased as a result of this procedure.

In order to eliminate disturbing side effects of the ring interferometer, it is expedient to interpose a waveguide mode diaphragm 10 and 20 into the beam paths of the weakened laser beam 50' and the light beam group 114 respectively. The mode diaphragm 10 includes a monomode light waveguide 101, while the mode diaphragm 20 includes a monomode waveguide 201 both of which are like the light waveguides 13 and can consist of a monomode glass fiber light waveguide. Each of the mode diaphragms will also include lens or optics such as the optics 101 and 103 for the mode diaphragm 10 and the optics 202 and 203 for the mode diaphragm 20. These optics each function in the same manner as the optics 71 and 72. End surfaces of the waveguide forming the mode diaphragms 10 and 20 act as coupling points of the monomode light waveguide and can be adjusted to one another with extreme preciseness and relative ease.

The waveguide mode diaphragm can be used in the same way in both embodiments of the sensor. A monomode light waveguide is used and, like the light waveguides 13 for the orthogonal polarization states, the waveguide of the mode diaphragm will exhibit different propagation speeds and can exhibit over coupling between the states. The light waveguide 201 is non-critical in this respect since the polarizer 61 can be arranged between a beam divider 21 and the optics 202. Thus, changes in the polarization state in the mode diaphragm 201 will have no influence upon the signal of the detector 81. However, the light waveguide 101 is arranged in a more critical position. If the waveguide 101 influences the polarization of the transmitted light, this influence will lead to an adulterated measurement. For this reason, a fiber which at the maximum creates only a slight change in a polarization state of the irradiated light, must be selected for the light waveguide 101.

As already mentioned, the proposed sensor can be used as an accousitcal sensor. For this purpose, the phase coil 13 can be submerged, for example, in a bath of liquid exposed to the accoustical waves. It is favorable to select the ratio of the transmission to the reflection for the partially transparent reflector 21 as 50%:50%.

Although various minor modifications may be suggested by those versed in the art, it should be understood that I wish to embody within the scope of the patent granted hereon, all such modifications as reasonably and properly come within the scope of my contribution to the art.

I claim:

1. A process of utilizing a sensor which is sensitive to influences including pressure, heat, tension and torsion, said process including: providing a sensor having means for receiving influences from pressure, heat, tension and torsion, said means comprising a ring interferometer having a light source, a pair of detectors, and a waveguide wound in a coil with a coupling point at each end, said waveguide being capable of propagating only one mode of specific first and second polarization states with the second polarization state being of a fixed relationship to said first polarization state; said ring interferometer having (1) means for coupling light of said first polarization state from said source into each coupling point of the waveguide for propagation therein to the other coupling point for output coupling therefrom, (2) means for receiving said output coupled light from said pair of coupling points, for superimposing components thereof into two separate superimposed beams, and for separately directing said two separate beams at said pair of detectors, and (3) a polarizer which is transparent to only said second polarization state and which is located in the path of each separate superimposed beam adjacent a light receiving surface of the respective detector; subjecting said interferometer to one of said influences to cause a changeover of light of said first polarization state to the second polarization state to change the intensity of the light of said second polarization state; and measuring the change in the intensity of the light of the second polarization state received at said detectors.

2. A process according to claim 1, wherein the interferometer includes means for compensating for phase differences in the light traveling in the coiled waveguide, and said process includes the steps of continuously compensating for phase changes by operating the means for compensating to apply other effects to produce non-reciprocal transit time differences in the light waveguide.

3. A process according to claim 2, wherein the step of compensating comprises producing a Faraday effect on the waveguide.

4. A process according to claim 2, which includes the further step of eliminating disturbing side effects from each of the superimposed beams by providing a mode diaphragm in the path of each superimposed beam.

5. A process according to claim 1, which includes the further step of eliminating disturbing side effects from each of the superimposed beams by providing a mode diaphragm in the path of each superimposed beam.

* * * * *